UNITED STATES PATENT OFFICE.

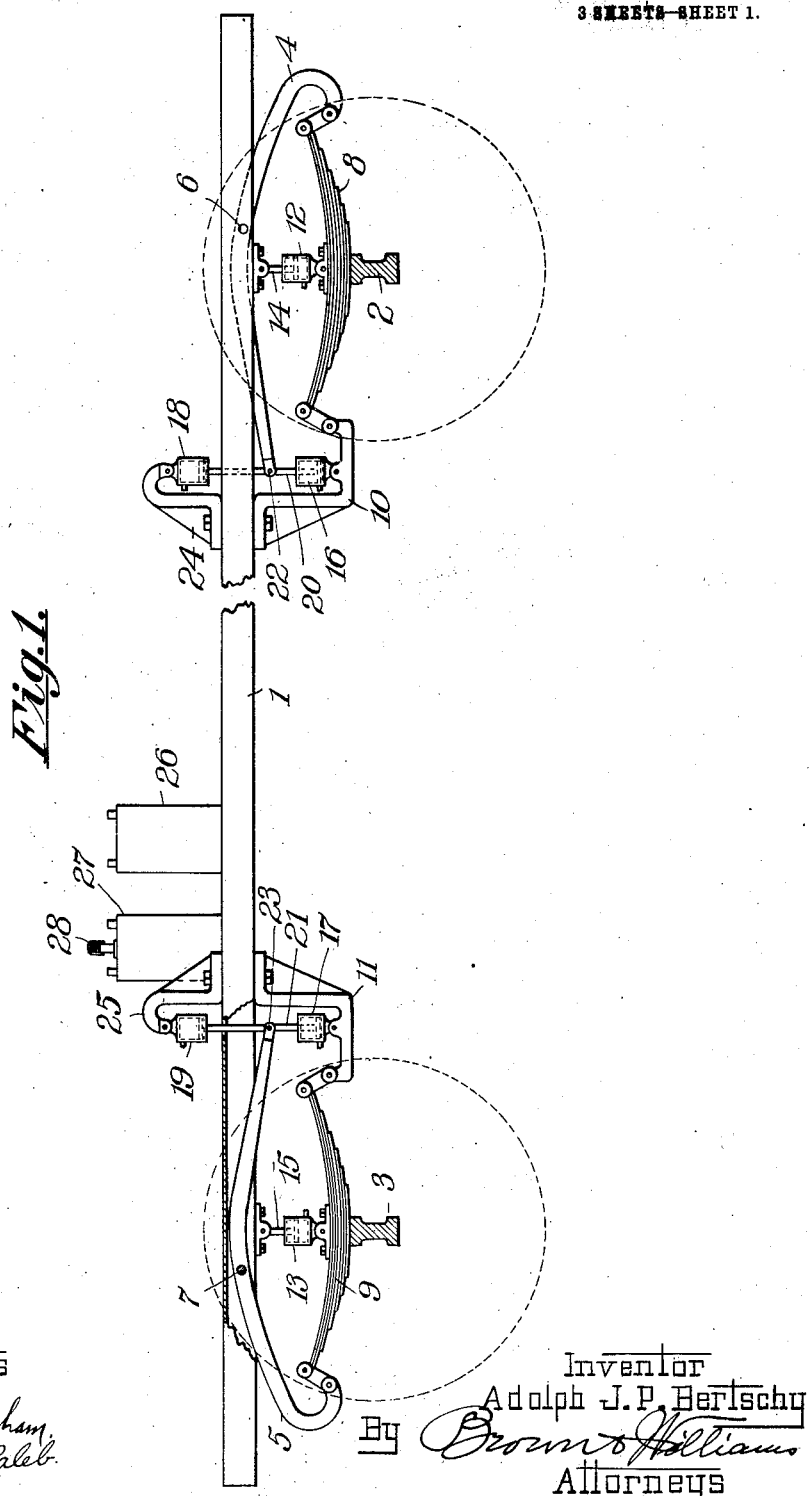

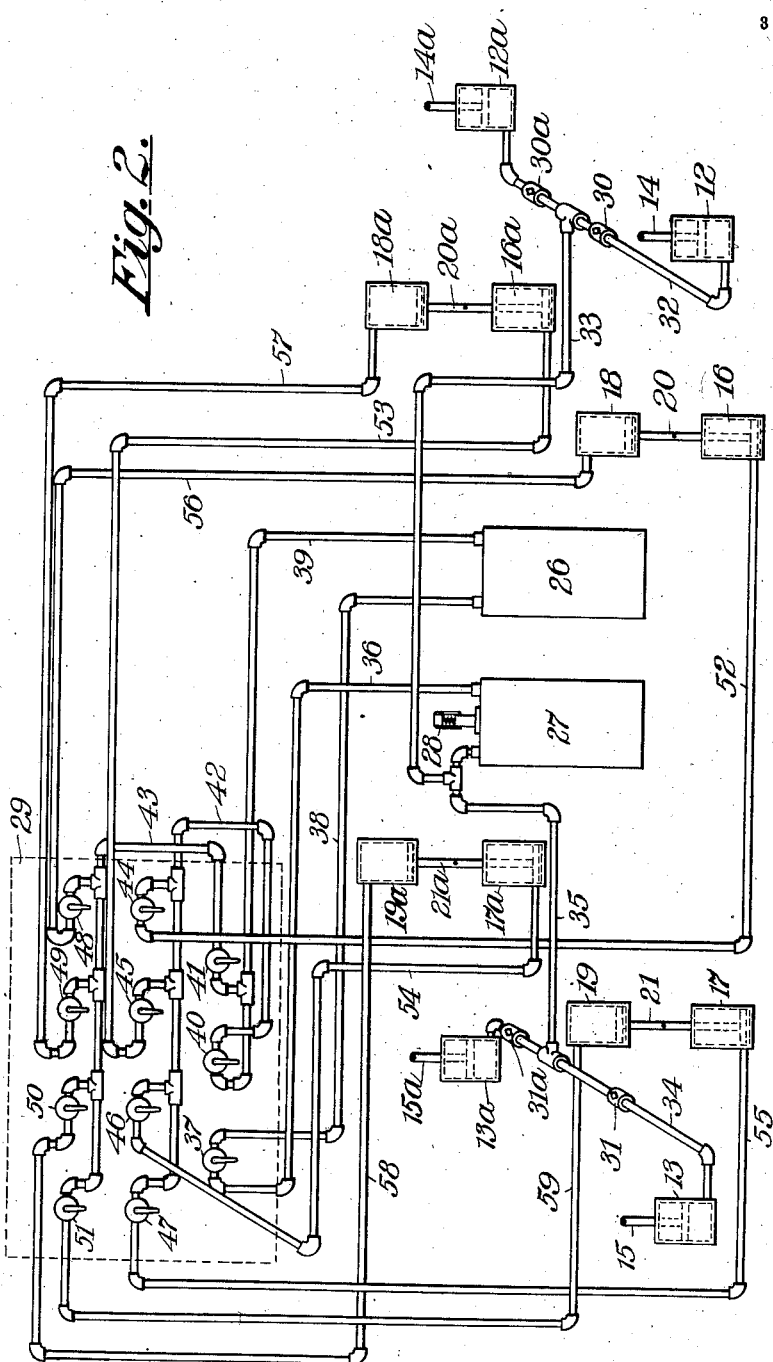

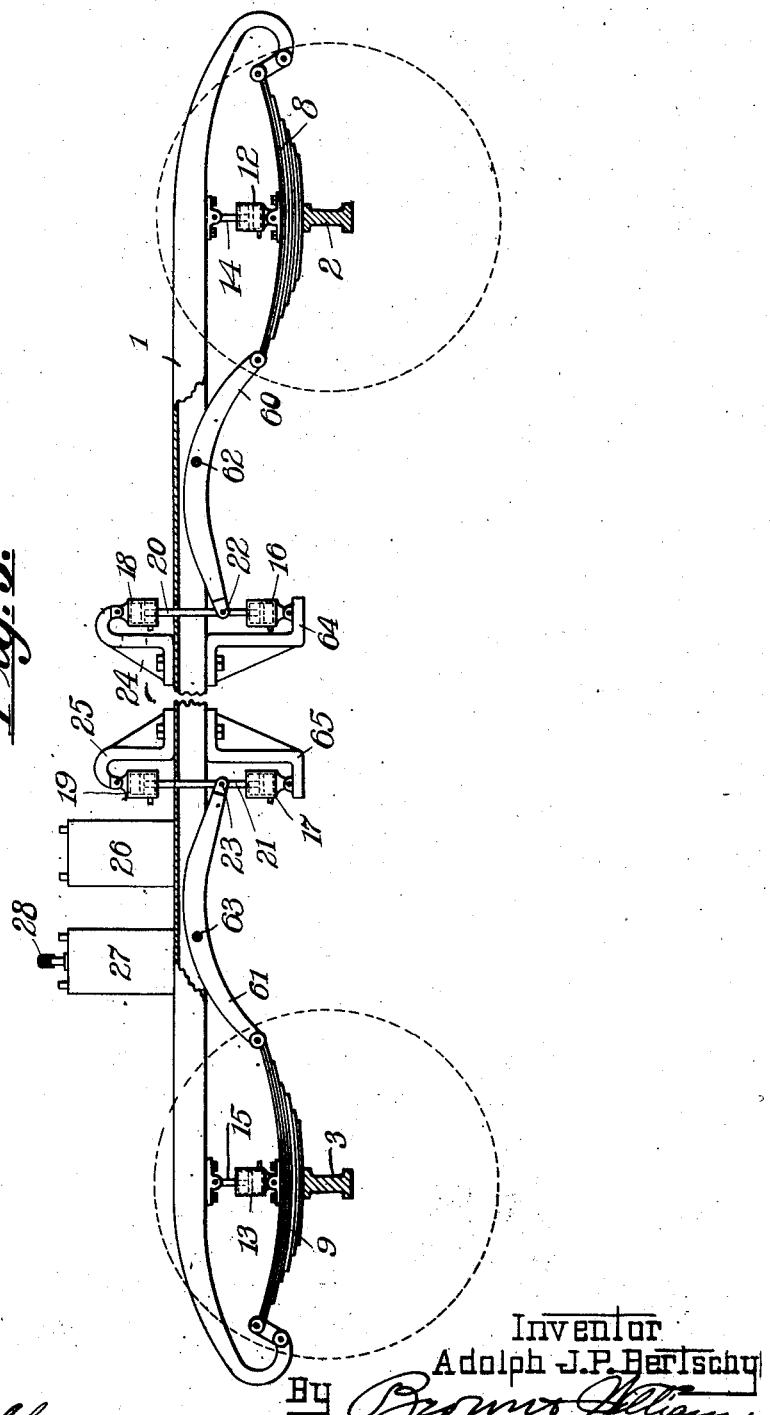

ADOLPH J. P. BERTSCHY, OF CHICAGO, ILLINOIS.

SHOCK-ABSORBING MECHANISM.

1,011,560.  Specification of Letters Patent.  Patented Dec. 12, 1911.

Application filed May 20, 1908. Serial No. 433,799.

*To all whom it may concern:*

Be it known that I, ADOLPH J. P. BERTSCHY, a citizen of the United States, residing at Chicago, in the county of Cook and State of Illinois, have invented a certain new and useful Improvement in Shock-Absorbing Mechanism, of which the following is a full, clear, concise, and exact description, reference being had to the accompanying drawings, forming a part of this specification.

My invention relates to means employed on automobiles or other vehicles for neutralizing the shock or impact experienced by the wheels of the vehicle in order that the resultant shock or impact imparted to the frame of the vehicle may be reduced to a minimum.

My invention consists broadly in associating with the wheels of the vehicle cushioning means, the resistance of which may be varied as desired, as a result of which the force exerted upon the axles relatively to the vehicle may be varied as desired.
In the practice of my invention, I find it desirable to provide independent means for regulating the resistance of the cushioning means used for the different wheels and I also find it desirable to employ independent cushioning means to neutralize the shock or impact in each direction at each wheel.

In the operation of my invention, I find it desirable to use a system of control employing air under pressure to offer the required resistance in the several cushioning means, and in order to conveniently regulate the various shock absorbing or cushioning devices I may employ regulating valves or mechanisms, all preferably located within easy reach of the driver of the vehicle—as for example, on the dashboard.

My invention also consists in associating with the axles and frame of the vehicle means for maintaining suitable air pressure as a result of the motion of the axles relatively to the vehicle. The air thus compressed is stored in suitable reservoirs and may be used to adjust the cushioning devices as desired.

My invention contemplates a system of control for the cushioning devices which may be common or individual, as desired, and I find that compressed air operates very satisfactorily to offer the resistance required in the cushioning devices since the opposition offered at first to displacement is comparatively small and rapidly increases as the air is further compressed by the operation of such cushioning devices.

The several drawings illustrating my invention are as follows:

Figure 1 is a side view of the vehicle and shows the framework and axles together with the cushioning devices employed. Fig. 2 shows partly in diagram the system of piping employed between the several cushioning devices and the regulating or controlling valves. Fig. 3 shows in a view similar to Fig. 1, a modified form of suspension of the axles from the frame and a system of cushioning devices similar to those shown in Fig. 1.

Similar numerals refer to similar parts throughout the several views.

Referring to Fig. 1 of the drawings: the frame 1 has pivoted near its ends at 6 and 7 the bent levers 4 and 5 connected at their outer ends to the springs 8 and 9, which springs are in turn secured to the axles 2 and 3 respectively. The other ends of the levers 4 and 5 are secured at points 22 and 23 to rods 20 and 21 terminating in plungers contained in the cylinders 16, 18 and 17, 19. The cylinders 16 and 17 are suitably supported from the under side of the frame 1 by means of brackets 10 and 11, which also serve to support the inner ends of the springs 8 and 9. The cylinders 18 and 19 are supported above the frame 1 by means of brackets 24 and 25. From the construction described, it will be understood that if compressed air is admitted into the cylinders 16 and 17 below the plungers therein, the weight of the vehicle will be supported in part by the compressed air contained within these cylinders, as a result of which if one of the wheels strikes an obstruction the excess of force imparted for the instant to the axle will be communicated through the bent lever to the plunger and thus be received directly by the compressed air in the cylinder. The cylinders 18 and 19 serve to prevent the axles 2 and 3 from dropping too suddenly when the wheels come to depressions in the road, and as a result it is desirable that the air pressure in the cylinders 18 and 19 shall not be as great as in the cylinders 16 and 17. As a means for maintaining suitable air pressure to operate the cushioning devices, I make use of cylinders 12 and 13 secured to the upper sides of the springs 8 and 9 and coöperating with plungers carried by rods 14 and 15 from the under side of the frame 1. From this construction, it is evident that these cylinders 12 and 13 may be used as pumps to provide compressed air, the operation of the pumps being caused by the motion of the axles vertically relatively to the frame. These pumps are adapted to deliver the compressed air to a suitable tank 27 provided with a safety valve 28, and a second tank 26 is supplied from the tank 27 in a manner to be described.

It is to be understood that the equipment shown in Fig. 1 for supporting the wheels and compressing the air is duplicated on the other side of the vehicle.

Referring to Fig. 2, the cushioning devices located on the far side of the vehicle and not shown in Fig. 1 are indicated by the same numerals as the mechanism shown in Fig. 1 with the addition of the letter "a." In Fig. 2, the several cushioning devices and pump cylinders are shown diagrammatically connected by piping through control valves located on the dashboard of the vehicle to the air supply tanks. The pumps 13 and 13$^a$ are connected by pipe 34 through check valves 31, 31$^a$ with pipe 35 and thereby with the supply tank 27. The pumps 12 and 12$^a$ are connected by pipe 32 through the check valves 30 and 30$^a$ with the pipe 33 and thereby with the supply tank 27. Thus, means is provided by which each of the pumps indicated may be effective in supplying compressed air to the tank 27 and further that the operation of each of these pumps may be independent of the operation of all of the others. As described, a safety valve is provided on the tank 27 to guard against excessive pressure. The tank 27 is connected by pipe 36 through regulating valve 37 and pipe 38 with a second tank 26. The tank 26 is connected by pipe 39 through regulating valve 40 with regulating valves 44, 45, 46 and 47 connected through pipes 52, 53, 54 and 55 with cylinders 16, 16$^a$, 17$^a$ and 17 respectively. The tank 26 is also connected by pipe 39 through regulating valve 41 with regulating valves 48, 49, 50 and 51 connected through pipes 56, 57, 58 and 59 with cylinders 18, 18$^a$, 19$^a$ and 19 respectively. All of the regulating valves are represented as located on the dashboard 29 of the vehicle. These valves are provided in order that the air pressure in any one of the cylinders may be regulated to the desired amount, and since the detail of these valves forms no part of my present invention, it is not here shown or described. Any well known device of the reducing valve type may be used in this connection. From the arrangement of the regulating valves described, it will be understood that by adjusting the individual valves 44 to 51 inclusive, the cushioning cylinders may be independently controlled and adjusted to any degree of resistance desired. The cushioning devices may also be controlled in groups when desired by means of the regulating valves 40 and 41, in which case the individual valves are moved to their high pressure position, the valve 40 serving to control all of the lower cushioning devices and the valve 41 serving to control all of the upper cushioning devices. Again, if the individual regulating valves and the regulating valves 40 and 41 are moved to a high pressure position, the entire cushioning system may be controlled by means of the valve 37.

By means of the system just described, I am enabled to adjust the character of the support of the vehicle for different conditions of the road, also for different loads, and I am therefore not limited as to the roads that may be driven over or the amount of load that may be carried by the character of the steel spring supports ordinarily used.

In Fig. 3, the method of suspension is different, in that the springs 8 and 9 are supported at their outer ends directly from the frame 1, the inner ends of these springs being supported by bent levers 60 and 61 pivoted at 62 and 63 from the frame 1 and engaging at their inner ends at 22 and 23 with the rods 20 and 21, which rods are similar to those shown and described in connection with Fig. 1. In this modification the cylinders 16 and 17 are supported from the underside of the frame 1 by means of brackets 64 and 65. In other respects, the system of cushioning and control is the same as that already described for Fig. 1 and the results secured are similar.

While I have described my invention as using compressed air to effect the cushioning of the shock absorbing devices, I do not, however, limit myself to this cushioning means since I may employ other equivalent means without departing from the spirit of my invention. For instance, suitable liquid might be used, in which case the regulating valves would be of a type adapted to the particular cushioning medium employed.

While I have shown my invention in the particular embodiment herein disclosed, I do not, however, limit myself to this construction but desire to claim broadly any equivalent construction that will suggest itself to those skilled in the art.

What I claim is:

1. In a vehicle, a frame, axles supporting said frame, a set of upper cushioning devices, a set of lower cushioning devices, said sets of cushioning devices being adapted to use a fluid cushioning medium between said frame and said axles, means for exerting pressure on the cushioning medium by the vibrations between said frame and said axles, means for automatically supplying the cushioning devices with the medium thus placed under pressure, a dash board for said vehicle, means on said dash board for controlling the upper set of cushioning devices either independently or collectively, means on said dash board for regulating the lower set of cushioning devices either independently or collectively, and means on said dash board for simultaneously controlling all the cushioning devices.

2. In a vehicle, a frame, axles supporting said frame, a series of cushioning devices above said frame, a second series of cushioning devices below said frame, said series of devices being adapted to use a fluid cushioning medium between said frame and said axles, means for exerting pressure on the cushioning medium by the vibration between said frame and said axles, means for automatically supplying the cushioning means with the medium thus placed under pressure, a dash board for said vehicle, and mechanism on said dash board for controlling the pressure in each of said cushioning means either collectively or individually from said dash board.

3. In a vehicle, a frame, axles supporting said frame, a series of cushioning devices above said frame, a second series of cushioning devices below said frame, said series of devices being adapted to use a fluid cushioning medium between said frame and said axles, means for exerting pressure on the cushioning medium by the vibration between said frame and said axles, means for automatically supplying the cushioning means with the medium thus placed under pressure, a dash board for said vehicle, valves mounted on said dash board for independently or collectively regulating the upper series of cushioning devices, valves on said dash board for independently or collectively regulating the lower series of cushioning devices, and a valve for simultaneously controlling all of the cushioning devices.

4. In a vehicle, a frame, axles supporting said frame, a set of upper cushioning devices, a set of lower cushioning devices, said sets of cushioning devices being adapted to use a fluid cushioning medium between said frame and said axles, means for exerting pressure on the cushioning medium by the vibrations between said frame and said axles, means for automatically supplying the cushioning devices with the medium thus placed under pressure, a dash board for said vehicle, individual controlling valves on said dash board for regulating the upper set of cushioning devices, a common controlling valve for simultaneously regulating all of said upper cushioning devices, controlling valves on said dash board for independently regulating the lower set of cushioning devices, a common controlling valve for simultaneously regulating the lower set of cushioning devices, and a valve on said dash board for simultaneously controlling all of the cushioning devices.

In witness whereof I hereunto subscribe my name this 16th day of May A. D., 1908.

ADOLPH J. P. BERTSCHY.

Witnesses:
LEONARD W. NOVANDER,
JOHN C. MICHAEL.